US007125624B2

(12) United States Patent
Tanno

(10) Patent No.: US 7,125,624 B2
(45) Date of Patent: Oct. 24, 2006

(54) FUEL CELL SEPARATOR AND METHOD OF MANUFACTURE

(75) Inventor: Fumio Tanno, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 454 days.

(21) Appl. No.: 10/612,043

(22) Filed: Jul. 3, 2003

(65) Prior Publication Data

US 2004/0005493 A1 Jan. 8, 2004

Related U.S. Application Data

(63) Continuation-in-part of application No. 10/407,232, filed on Apr. 7, 2003, now abandoned.

(30) Foreign Application Priority Data

Apr. 8, 2002 (JP) ............................ 2002-104685
Apr. 4, 2003 (EP) ................................ 03252157
Apr. 7, 2003 (CA) .................................. 2424701

(51) Int. Cl.
*H01M 8/02* (2006.01)
*H01B 1/24* (2006.01)
*B29C 45/00* (2006.01)

(52) U.S. Cl. .................... 429/34; 252/511; 264/328.1; 264/331.11

(58) Field of Classification Search ................. 429/34, 429/38, 39; 264/328.1, 331.11; 252/511
See application file for complete search history.

(56) References Cited

U.S. PATENT DOCUMENTS

| | | | | |
|---|---|---|---|---|
| 4,301,222 | A * | 11/1981 | Emanuelson et al. | 429/34 X |
| 4,668,496 | A * | 5/1987 | Korb et al. | 423/445 R |
| 6,461,755 | B1 * | 10/2002 | Saito et al. | 429/34 |
| 6,746,792 | B1 * | 6/2004 | Hasegawa et al. | 429/34 |
| 6,890,678 | B1 * | 5/2005 | Tanno | 429/34 |
| 2002/0004156 | A1 * | 1/2002 | Mizuno | 429/34 |

FOREIGN PATENT DOCUMENTS

JP 2002-260682 9/2002

* cited by examiner

*Primary Examiner*—Stephen J. Kalafut
(74) *Attorney, Agent, or Firm*—Birch, Stewart, Kolasch & Birch, LLP

(57) ABSTRACT

A fuel cell separator is molded from a resin composition containing specific amounts of graphite, thermosetting resin and internal release agent. The graphite is a synthetic graphite powder prepared by graphitizing lump coke. The thermosetting resin is a mixture of phenolic novolac, benzoxazine and polycarbodiimide resins. The molded separator does not need to be machined, has a significantly improved electrical conductivity, heat resistance and mechanical strength, and even when very thin is resistant to breakage during molding and fuel cell assembly.

3 Claims, 1 Drawing Sheet

FUEL CELL SEPARATOR AND METHOD OF MANUFACTURE

CROSS REFERENCE TO RELATED APPLICATION

This application is a continuation-in-part of application Ser. No. 10/407,232 filed on Apr. 7, 2003, now abandoned the entire contents of which are hereby incorporated by reference.

TECHNICAL FIELD

The present invention relates to a fuel cell separator which requires no machining whatsoever after it has been molded, which has a significantly improved electrical conductivity, heat resistance and mechanical strength, and which is not subject to breakage during molding and cell assembly even when the thin areas therein have a thickness of only 0.2 to 0.5 mm. The invention also relates to a method of manufacturing such fuel cell separators.

BACKGROUND ART

Fuel cells are devices which convert chemical energy directly into electrical energy by placing a pair of electrodes in mutual contact through an intervening electrolyte, feeding a fuel to one of the electrodes and an oxidant to the other electrode, and carrying out oxidation of the fuel electrochemically within the cell. There are several types of fuel cells, depending on the electrolyte used. Solid polymer fuel cells in which the electrolyte is a solid polymer electrolyte membrane have attracted considerable attention recently for their ability to achieve a high energy output.

As shown in FIG. 1, such solid polymer fuel cells are composed of a stack of from several tens to several hundreds of unit cells. Each unit cell has a pair of fuel cell separators 1, 1 with a plurality of ribs 1*a* on either side thereof. Between the separators 1 are disposed a solid polymer electrolyte membrane 2 and a pair of gas diffusing electrodes (a fuel electrode and an oxidant electrode) 3, 3.

Of the components making up this type of fuel cell, the fuel cell separator has the distinctive shape of a thin plate provided on one or both sides thereof with a plurality of flow channels 4 for the supply and removal of gases. The separator plays several important roles, one of which is to separate the fuel gas, oxidant gas, and cooling water flowing through the fuel cell to keep them from mingling. In addition, it carries away electrical energy generated by the cell, and dissipates to the exterior heat that has formed within the cell. Accordingly, a need has been strongly felt for fuel cell separators which, in addition to having gas barrier properties, electrical conductivity and corrosion resistance, also have sufficient mechanical strength to resist cracking and breaking of the separators from the tightening of bolts and nuts during fuel cell assembly, and which moreover are endowed with excellent vibration and impact resistance when the fuel cell is used as a mobile power supply such as in automobiles.

Known methods for manufacturing such fuel cell separators include processes in which the separator is fabricated by:

1) molding a thermosetting resin, heat-curing the molded resin, then machining;
2) machining dense carbon that has been impregnated with a thermosetting resin;

3) laminating and pressing together carbon fiber nonwoven fabrics impregnated with an electrically conductive coating;
4) working together a carbon powder and a phenolic resin, then molding the resulting blend under heat and pressure;
5) blending together a carbon powder, a phenolic resin and carbon fibers, then compression molding the blend.

However, when a heat-cured resin product or resin-impregnated dense carbon is machined, the costs of machining are high. Moreover, separators having a small thickness are subject to breakage during machining and fuel cell assembly. In prior-art processes that involve molding a conductive coating-impregnated carbon fiber nonwoven fabric, the nonwoven fabric interferes with the shaping of grooves.

In processes which involve molding a mixture of graphite powder and resin, increasing the proportion of conductive filler so as to enhance the electrical conductivity lowers the moldability and mechanical strength. On the other hand, increasing the proportion of binder resin to improve moldability and mechanical strength lowers the electrical conductivity. Methods for producing separators from a mixture of graphite powder, phenolic resin and carbon fibers do enhance the strength, but the resulting separators have a very high flexural modulus, making them subject to breakage when thin.

SUMMARY OF THE INVENTION

It is therefore an object of the present invention to provide a fuel cell separator which requires no machining whatsoever after it has been molded, which has a significantly improved electrical conductivity, heat resistance and mechanical strength, and which is not subject to breakage during molding and cell assembly even when the thin areas therein have a thickness of only 0.2 to 0.5 mm. Another object of the invention is to provide to a method of manufacturing such fuel cell separators.

It has been discovered that when fuel cell separators are molded from a resin composition which includes graphite, a thermosetting resin and an internal release agent, better results are obtained using as the graphite a synthetic graphite powder prepared by subjecting lump coke to a high degree of graphitization and as the thermosetting resin a mixture of phenolic novolac resin, benzoxazine resin and polycarbodiimide resin.

Accordingly, in a first aspect, the invention provides a fuel cell separator molded from a resin composition which includes 65 to 90 wt % of graphite, 10 to 35 wt % of a thermosetting resin and 0.1 to 2 wt % of an internal release agent. The graphite is a synthetic graphite powder prepared by subjecting lump coke to a high degree of graphitization. The thermosetting resin is a mixture of phenolic novolac resin, benzoxazine resin and polycarbodiimide resin.

In a second aspect, the invention provides a fuel cell separator manufacturing method wherein the resin composition according to the first aspect of the invention is injection molded, transfer molded or compression molded.

DETAILED DESCRIPTION OF THE INVENTION

Figure 1:
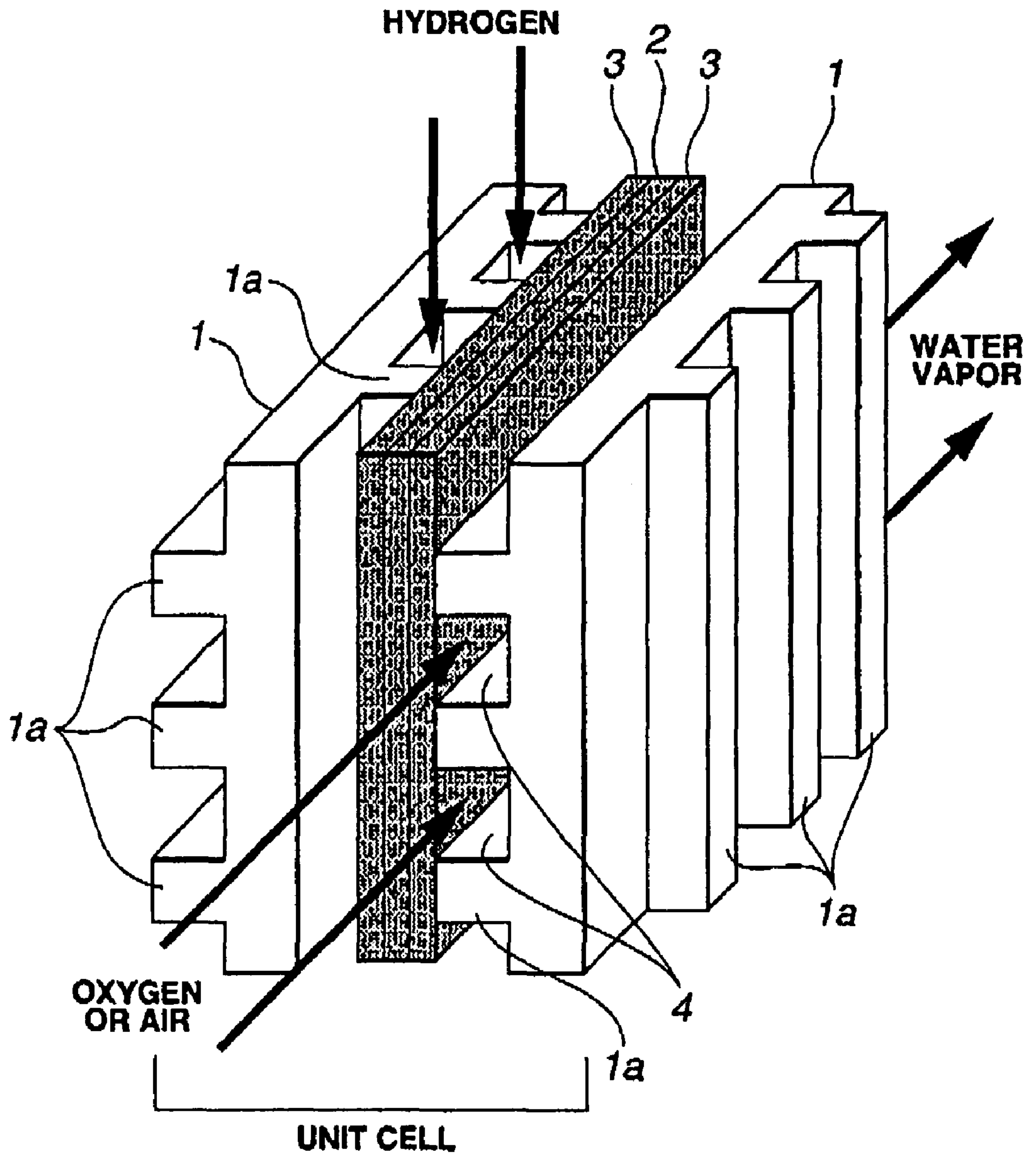
FIG. 1 is a perspective view showing an example of a fuel cell.

As noted above, the fuel cell separator of the invention is formed by molding a resin composition which includes 65 to 90 wt % of graphite, 10 to 35 wt % of a thermosetting resin and 0.1 to 2 wt % of an internal release agent.

The graphite used herein is a synthetic graphite powder (bulk graphite) prepared by subjecting lump coke to a high degree of graphitization. Such synthetic graphite prepared from lump coke does not readily orient during molding of the resin composition, which is conducive to achieving good strength. Use of this type of synthetic graphite makes it possible to obtain a fuel cell separator endowed with excellent mechanical strength, good electrical conductivity in the thickness direction, and minimal variation in the resistance values.

If the above graphite powder has too small an average particle size, the resin component is adsorbed thereon, which may lower the flow properties of the overall composition. On the other hand, an average particle size which is too large may lower the strength of the separator obtained therefrom. Hence, it is desirable for the graphite powder to have an average particle size of 10 to 200 μm, preferably 30 to 200 μm, and most preferably 30 to 100 μm.

By using a mixture of phenolic novolac resin, benzoxazine resin and polycarbodiimide resin as the thermosetting resin in the above-described resin composition, there can be obtained a separator endowed with excellent mechanical strength and heat resistance even when of small thickness. That is, when the above mixture is used as the thermosetting resin, the separator cures by means of crosslinking reactions between the phenolic novolak resin, the benzoxazine resin and the polycarbodiimide resin. One result is a much lower volatiles content than when curing is achieved by a conventional reaction between a phenolic novolak resin and hexamethylenetetramine (hexamine).

The composition also undergoes substantially no volumetric shrinkage during molding, and thus is dimensionally stable. In addition, the composition is substantially free of leachates in hot water, making it possible to keep the operating efficiency of the fuel cell stable. Moreover, the addition of polycarbodiimide resin increases the heat resistance of the separator, enabling the separator to maintain a stable mechanical strength when hot.

The phenolic novolak resin has a molecular weight within a range of preferably 3,000 to 10,000, and most preferably 5,000 to 8,000.

The benzoxazine resin has a molecular weight within a range of preferably 500 to 5,000, and most preferably 1,000 to 2,000.

The polycarbodiimide resin has a molecular weight within a range of preferably 500 to 5,000, and most preferably 1,000 to 3,000.

The phenolic novolak, benzoxazine and polycarbodiimide resins are mixed in respective proportions by weight of 0.1 to 5 parts, and preferably 1 to 5 parts, of phenolic novolak resin; 2 to 10 parts, and preferably 2 to 5 parts, of benzoxazine resin; and 0.1 to 2 parts, and preferably 0.1 to 0.5 part, of polycarbodiimide resin. A typical weight ratio between the three resins is 2:3:0.3.

Illustrative examples of the internal release agent include carnauba wax, fatty acid esters, metal salts of stearic acid, and metal salts of montanic acid. Of these, carnauba wax is preferred because it is substantially free of leachates in hot water.

The above-described resin composition may also include, if necessary, optional components for enhancing strength, release properties, resistance to hydrolysis, electrical conductivity and other characteristics. Such optional components include fibrous bases, fillers, metal powders, and anti-hydrolysis additives.

Examples of suitable fibrous bases include inorganic fibers such as metal fibers (e.g., iron, copper, brass, bronze, aluminum), ceramic fibers, potassium titanate fibers, glass fibers, carbon fibers, gypsum fibers, rock wool, wollastonite, sepiolite, attapulgite, and synthetic mineral fibers; and organic fibers such as aramid fibers, polyimide fibers, polyamide fibers, phenolic fibers, cellulose and acrylic fibers: Any one or combination of two or more thereof may be used. The fibrous base is typically included in an amount of 3 to 30 wt %, and preferably 5 to 20 wt %, of the separator.

The filler may be a granular organic or inorganic filler. Illustrative examples include silicates such as wollastonite, sericite, mica, clay, bentonite, asbestos, talc and alumina silicate; metal oxides such as alumina, silicon oxide, magnesium oxide, zirconium oxide and titanium oxide; carbonates such as calcium carbonate, magnesium carbonate and dolomite; sulfates such as calcium sulfate and barium sulfate; glass beads, boron nitride, silicon carbide and silica. It is also possible for the filler to be hollow or porous. To increase adhesion of the filler with the above-described thermosetting resin serving as the binder, prior to use the filler may be surface treated with a silane coupling agent, carbodiimide, or any of various suitable emulsions. The filler is typically included in an amount of 3 to 20 wt %, and preferably 5 to 15 wt %, of the separator.

Metal powders that may be used in the resin composition include stainless steel, gold, silver, copper, platinum, titanium, aluminum and nickel powders. The metal powder has an average particle size of generally about 5 to 30 μm.

When fuel cell separators are produced using a resin composition according to the invention, the above-described components are typically stirred and blended in a suitable apparatus such as a Henschel mixer, following which a kneader is used to melt and work the blended resin composition at a temperature within a range of about 80 to 100° C. The kneaded resin composition is then preferably injection molded, transfer molded or compression molded to form a fuel cell separator.

EXAMPLES

The following examples and comparative examples are provided to illustrate the invention, and are not intended to limit the scope thereof.

Example 1

A resin composition consisting of 6 wt % phenolic novolak resin, 9 wt % benzoxazine resin and 0.9 wt % polycarbodiimide resin had added thereto 83.1 wt % of bulk graphite powder having an average particle size of 50 μm and 1 wt % of carnauba wax. The resulting composition was stirred and blended in a Henschel mixer, then melted and worked in a kneader to form a compound. The compound was charged into a separator-forming mold, then compression molded at a mold temperature of 180° C. and a pressure of 300 MPa for 5 minutes, yielding fuel cell separators 1 having a length of 300 mm, a width of 200 mm, a thickness of 0.3 mm in the thinnest areas, and bearing ribs on the left and right sides as shown in FIG. 1.

Example 2

Aside from increasing the proportions of the resin components to 1.33 times the respective levels in Example 1 and reducing the amount of bulk graphite accordingly, fuel cell separators 1 were produced in the same way as in Example 1.

Example 3

Aside from replacing 10 wt % of the 83.1 wt % of bulk graphite with glass fibers, fuel cell separators 1 were produced in the same way as in Example 1.

Comparative Example 1

Aside from replacing the bulk graphite with needle graphite, fuel cell separators 1 were produced in the same way as in Example 1.

Comparative Example 2

Aside from replacing the bulk graphite with expanded graphite, fuel cell separators 1 were produced in the same way as in Example 1.

Comparative Example 3

Aside from replacing the bulk graphite with flake graphite, fuel cell separators 1 were produced in the same way as in Example 1.

Comparative Example 4

Aside from keeping the proportions of the resin composition the same but removing polycarbodiimide resin from the resin components, fuel cell separators 1 were produced in the same way as in Example 1.

Comparative Example 5

Aside from keeping the proportions of the resin composition the same but having the resin components consist instead of a mixture of phenolic novolak resin with the curing agent hexamine, fuel cell separators 1 were produced in the same way as in Example 1.

Comparative Example 6

Aside from replacing the resin components with a resole-type phenolic resin, fuel cell separators 1 were produced in the same way as in Example 1.

The resulting molded separators were tested by the methods described below to determine their specific resistance, flexural strength, flexural modulus, flexural strength when hot, flexural modulus when hot, and electrical conductivity (leach-out of electrical power generation Inhibitors). The results are given in Table 1.

TABLE 1

| | Example | | | Comparative Example | | | | | |
|---|---|---|---|---|---|---|---|---|---|
| | 1 | 2 | 3 | 1 | 2 | 3 | 4 | 5 | 6 |
| Component (parts by weight) | | | | | | | | | |
| Lump graphite | 83.1 | 77.8 | 73.1 | | | | 83.1 | 83.1 | 83.1 |
| Needle graphite | | | | 83.1 | | | | | |
| Expanded graphite | | | | | 83.1 | | | | |
| Flake graphite | | | | | | 83.1 | | | |
| Phenolic novolac resin | 6 | 8 | 6 | 6 | 6 | 6 | 6.3 | | |
| Phenolic novolac resin + hexamine | | | | | | | | 15.9 | |
| Benzoxazine resin | 9 | 12 | 9 | 8 | 9 | 9 | 9.6 | | |
| Polycarbodiimide resin | 0.9 | 1.2 | 0.9 | 0.9 | 0.9 | 0.9 | | | |
| Liquid phenolic resin (resole) | | | | | | | | | 15.9 |
| Glass fibers | | | 10 | | | | | | |
| Carnauba wax | 1 | 1 | 1 | 1 | 1 | 1 | 1 | 1 | 1 |
| Properties | | | | | | | | | |
| Specific resistance (mΩ · cm) | 8 | 13 | 18 | 7 | 10 | 8 | 7 | 10 | 7 |
| Flexuxal strength (MPa) | 60 | 70 | 80 | 40 | 30 | 40 | 50 | 40 | 40 |
| Flexural modulus (GPa) | 10 | 10 | 12 | 14 | 10 | 35 | 10 | 35 | 33 |
| Flexural strength when hot (80° C.) (MPa) | 60 | 70 | 80 | 40 | 30 | 40 | 30 | 30 | 30 |
| Flexural modulus when hot (80° C.) (GPa) | 10 | 10 | 12 | 14 | 10 | 35 | 6 | 29 | 24 |

TABLE 1-continued

| | Example | | | Comparative Example | | | | | |
|---|---|---|---|---|---|---|---|---|---|
| | 1 | 2 | 3 | 1 | 2 | 3 | 4 | 5 | 6 |
| Electrical conductivity after 500 h at 90° C. (μS/cm) | 4 | 6 | 11 | 4 | 4 | 4 | 13 | 300 | 30 |

Lump graphite: Average particle size, 50 μm (SGL 50, by SEC Corporation)
Needle graphite: Average particle size, 60 μm (SGP 60, by SEC Corporation)
Expanded graphite: Average particle size, 30 μm (EXP 30, by Nippon Graphite Industries, Ltd.)
Flake graphite: Average particle size, 50 μm (BF 50A, by Chuetsu Graphite Industries, Ltd.)

The various properties were measured as follows.

Specific Resistance:

Measured by the four-probe method described in JIS H-0602.

Flexural Strength, Flexural Modulus:

Test pieces measuring 100×10×0.3 mm were produced by compression molding the resin composition at a mold temperature of 180° C. and a pressure of 300 MPa for 5 minutes. The flexural strength and flexural modulus were measured at a span of 80 mm in accordance with JIS K6911 (General Test Methods for Thermoset Plastics).

Electrical Conductivity:

A 15 g piece of the separator was cut out, immersed in 400 g of ion-exchanged water, and heated at 90° C. for 40 days, following which the electrical conductivity of the ion-exchanged water was measured. This measurement was used as an indicator of the amount of electrical power generation inhibitors that leach out of the separator.

It is apparent from Table 1 that, compared to the fuel cell separators obtained in Comparative Examples 1 to 3, the fuel cell separators obtained in Examples 1 to 3 according to the invention had improved flexural strength without a substantial increase in flexural modulus. Hence, the separators according to the invention are resistant to breakage even when fabricated to a small thickness. Moreover, unlike with the separators obtained in Comparative Example 4 to 6, the separators produced in Examples 1 to 3 showed no change in their strength characteristics at 80° C., demonstrating that the inventive separators are able to maintain a stable assembled state with the other fuel cell components during operation of the fuel cell. Moreover, compared with the separators obtained in Comparative Examples 4 to 6, the separators in Examples 1 to 3 had a lower level of leachates that inhibit electrical power generation by the fuel cell.

As described above and demonstrated in the examples, the fuel cell separator of the invention requires no machining whatsoever after it has been molded, has a significantly enhanced electrical conductivity, heat resistance and mechanical strength, and is not subject to breakage during molding and cell assembly even at a thickness in the thinnest areas of only 0.2 to 0.5 mm.

The invention claimed is:

1. A fuel cell separator molded from a resin composition comprising 65 to 90 wt % of graphite, 10 to 35 wt % of a thermosetting resin and 0.1 to 2 wt % of an internal release agent, wherein the graphite is a synthetic graphite powder prepared by subjecting lump coke to graphitization and the thermosetting resin is a mixture of phenolic novolac resin, benzoxazine resin and polycarbodiimide resin.

2. The fuel cell separator of claim 1, wherein the graphite is a synthetic graphite powder having an average particle size of 30 to 200 μm.

3. A method of manufacturing fuel cell separators, comprising injection molding, transfer molding or compression molding the resin composition of claim 1.

* * * * *